United States Patent
Forte et al.

(10) Patent No.: US 7,087,314 B2
(45) Date of Patent: *Aug. 8, 2006

(54) NONORIENTED STIFF PACKAGING FILM WITH SUPERIOR TEAR PROPERTIES

(75) Inventors: Nicholas F. Forte, Yorktown, VA (US); Sharon L. Korp, McAlester, OK (US)

(73) Assignee: Pliant Corporation, Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/937,957

(22) Filed: Sep. 10, 2004

(65) Prior Publication Data

US 2005/0037186 A1     Feb. 17, 2005

Related U.S. Application Data

(62) Division of application No. 10/126,051, filed on Apr. 17, 2002, now Pat. No. 6,825,276.

(60) Provisional application No. 60/284,544, filed on Apr. 17, 2001.

(51) Int. Cl.
| | |
|---|---|
| B32B 27/00 | (2006.01) |
| B32B 27/08 | (2006.01) |
| C08F 8/00 | (2006.01) |
| C08K 5/00 | (2006.01) |
| C08L 23/00 | (2006.01) |
| C08L 23/04 | (2006.01) |
| C09B 67/00 | (2006.01) |

(52) U.S. Cl. ............. 428/500; 428/515; 525/191; 525/240; 524/502; 524/515

(58) Field of Classification Search ............ 428/500, 428/515; 525/191, 240; 524/502, 515
See application file for complete search history.

(56) References Cited

U.S. PATENT DOCUMENTS 6,306,518 B1 * 10/2001 Shah et al. ............ 428/516
6,825,276 B1 * 11/2004 Forte et al. ............ 525/191

* cited by examiner

*Primary Examiner*—Nathan M. Nutter
(74) *Attorney, Agent, or Firm*—McAndrews, Held & Malloy, Ltd.

(57) ABSTRACT

A nonoriented film containing highly crystalline polypropylene, standard polypropylene and nucleating agents. The film has physical properties that are desirable for applications such as food wrappers and tampon overwrap, including good tearability, stiffness and memory. In addition, the nonoriented film is cost effective because the film achieves these physical properties without the step of stretching or orienting the film, as required for conventional polypropylene films used in food wrappers and tampon overwrap.

44 Claims, 1 Drawing Sheet

NONORIENTED STIFF PACKAGING FILM WITH SUPERIOR TEAR PROPERTIES

RELATED APPLICATIONS

This application is a Division of U.S. application Ser. No. 10/126,051 now U.S. Pat. No. 6,825,276, entitled "Nonoriented Stiff Packaging Film with Superior Tear Properties," filed on Apr. 17, 2002, which claims the benefit of U.S. Provisional Application No. 60/284,544, filed Apr. 17, 2001, entitled "Non-Oriented, High Modulus Packaging Film with Excellent Tearability." U.S. Provisional Application No. 60/284,544 and U.S. Pat. No. 6,825,276 are hereby incorporated by reference in their entirety.

TECHNICAL FIELD

This invention relates to packaging films and, in particular, to a nonoriented packaging film. The packaging film is formulated to have a level of stiffness, memory and ease of tearing which is desirable for applications such as food packaging and tampon overwrap.

BACKGROUND OF THE INVENTION

This invention concerns packaging films and, in particular, packaging films that can be easily opened by tearing but that, at the same time, protect the product contained within the film from dirt, dust, moisture or other contamination. Exemplary uses for such films include, for example, candy wrappers, tampon overwrap, ice cream wrappers, and individual snack food wrappers. It should, however, be understood that the film of the present invention may have many other uses. The packaging film has an optimized modulus level which allows the film to maintain its shape. For example, in the instance of use of the film as a wrapper for hard candy, the film is wrapped around the piece of hard candy and the protruding edges are twisted. Memory and secant modulus are attributes required to enable the film to keep its position and prevent the hard candy from becoming dislodged until forced out of film by an external force.

In response to this demand, biaxially oriented polypropylene (BOPP) films were produced and achieved an important position in the packaging industry, especially in the packaging of foods, owing to their stiffness, strength, clarity, and moisture barrier properties. Currently, this market segment accounts for about 70% of the BOPP films produced. In general, the films are generally multilayer structures produced by the so-called tenter process. In this process, the polymers are melted and homogenized in extruders. The melts are filtered, and brought together in a slot or annular die, where they are extruded to produce a monolayer or multilayer melt film. In slot die extrusion, the melt curtain is cast onto a chill roll, where it crystallizes. In annular die extrusion, the film is quenched with air to form a solid film. The film is subsequently oriented or stretched in the longitudinal and transverse directions. The stretching process is typically a three-stage process, as described, for example, in EP-0 116 457 B1. After being stretched, the film is cooled to room temperature, and trimmed at both edges. If desired, the film is then surface treated. The film is subsequently wound and packaged according to customer specifications. The application-relevant properties of BOPP films are principally determined by the biaxial orientation and the polymer compositions thereof. However, the biaxial orientation production process has many disadvantages. First, the process involves the use of expensive equipment and introduces an additional step into the manufacturing process, thereby resulting in an inefficient and costly production process. Second, due to the stress during processing of the film, the film is highly susceptible to breakdowns in the course of production, for example, tears in the film.

Several prior art films have been developed to replace BOPP films. One such prior art film is manufactured by coating a polymer film with a resin layer including a propylene copolymer, an α-olefin having four or more carbons, and ethylene. The resulting film exhibits inferior tear properties, due to the presence of ethylene and the crystallinity of the polypropylene components. Further, the film necessitates lamination of the resin layer to the polymer film, which further decreases the tearability of the film.

Another prior art BOPP replacement film is manufactured by orienting the film in only one direction. However, this process involves the use of outdated film orientation equipment, and although it eliminates one processing step, the remaining orientation step is still time-consuming, expensive, and increases the frequency of processing breakdown.

An additional prior art BOPP replacement film involves the addition of a weakening line in the film or scoring the film itself. Alternatively, a row of notches may be added at each end seal of the wrap. However, these packaging films are relatively expensive to produce because of the additional equipment costs and the additional manufacturing steps. Further, where the tear lines are beyond the enclosed product, a great deal of wrap material is wasted, thereby increasing processing costs.

Yet another prior art packaging film involves the addition of a tearstrip. The tearstrip is a narrow band of supportive material adhered along the inside periphery of the wrapped product packaging and ending in a tab that is notched on either side. As the tab is lifted and pulled, due to the notching and pull force, a tear begins to propagate in the direction of the pull. However, the addition of the tab is a costly alternative.

It would be desirable, therefore, to provide a cost-effective packaging film with good stiffness, low tensile elongation at yield, good dead-fold characteristics, and good tearability.

SUMMARY OF THE INVENTION

An object of the present invention is to provide a packaging film that does not require orienting to have good tearability and stiffness.

A further object of the present invention is to provide a waterproof packaging film with increased clarity and adequate dead-fold characteristics.

The present invention is a nonoriented packaging film that includes standard polypropylene and highly crystalline polypropylene (hcPP) with a melt flow rate of 20 g/10 minutes or greater. HcPP is conventionally used in applications such as injection molding, as described in U.S. Pat. No. 6,162,887. U.S. Pat. No. 6,162,887 is incorporated herein by reference. The hcPP can be utilized to provide film with increased stiffness and crystallinity. While all polypropylene films develop some crystallinity as they age, it is the inherent, high level of crystallinity of hcPP that allows the inventive film to tear easily. Nucleating agents may be added to the film composition to attain desired dead-fold or memory and increased stiffness. Since no secondary or subsequent orientation processing step is required, the packaging film of the present invention is more cost-effective than prior art packaging films.

The film may be a single layer film or a multilayer film. In multilayer embodiment, skin layers with standard homopolymer polypropylene and no hcPP may encapsulate a core layer that includes hcPP and standard homopolymer polypropylene resins. Because the more crystalline core layer is positioned between two less crystalline layers, the film is more easily processed and has increased durability. Another multilayer embodiment has a core layer and two skin layer, each of the three layers containing hcPP resin.

The amount of hcPP resin contained within each layer may vary according to the properties desired in the film. For example, all layers may contain the same amount of hcPP resin. As a result, the layers have similar or the same viscosities and may be simultaneously co-extruded on standard co-extrusion equipment without the addition of processing acids.

Additional objects and advantages of this invention will become apparent from the following detailed description of preferred embodiments thereof which proceeds with reference to the accompanying drawings.

DETAILED DESCRIPTION OF PREFERRED EMBODIMENTS

The present invention is a nonoriented stiff packaging film for use in applications such as food packaging or candy wrapping. The composition of the film enables the film to be stiff and easy to tear without requiring stretching or orienting of the film. The film contains highly crystalline polypropylene ("hcPP"), conventional propylene and a nucleating agent. The film may also include color concentrates and film processing additives.

The inventive film, without orienting or stretching of the film, achieves the physical properties similar to those exhibited by films made from biaxially oriented polypropylene films. The amount of hcPP incorporated in the film is an amount sufficient to give the film the stiffness and tearability desired for applications such as food wrapping and tampon overwrap. Tear can be measured by the percentage elongation of the film before breaking, as measured by ASTM D 882, and by trouser tear (tear propagation), as measured by ASTM D 1938. Stiffness or modulus can be measured as the secant modulus, which is the ratio of stress to strain over a range for which this ratio is constant. Stated otherwise, secant modulus expresses the force required to deform the film by a given amount.

The inventive film preferably has sufficient crystallinity such that the film will break at elongation of 350% or less in the machine direction. More preferably the film has an elongation at break of less than about 200% in the machine direction, more preferably less than 100% in the machine direction. Even more preferably the final film has an elongation of about 15% or less in the machine direction. Also, the film preferably has a trouser tear that is less than about 100 grams, making the film easy to tear once the film is punctured. The inventive film also has sufficient stiffness or secant modulus for end uses such as food wrapping or tampon overwrap. Stated otherwise, the film has sufficient stiffness such that the film is able to be formed into a package holding a product and is able to retain its shape around the product. While secant modulus values may vary depending on testing equipment, the film preferably has a secant modulus value of about 200,000 psi or greater in the machine direction.

The amount of hcPP is selected to give the desired physical properties to the film without any orienting or stretching of the film. The amount of hcPP resin included in the film is preferably greater than 15% by weight of the film. Preferably, the amount of hcPP is in a range from about 30% to about 90% of the total film, more preferably, from about 35% to about 65%, giving the film elongation values of less than 100%. The amount of hcPP is even more preferably in a range from about 40% to about 50%.

Figure 1:
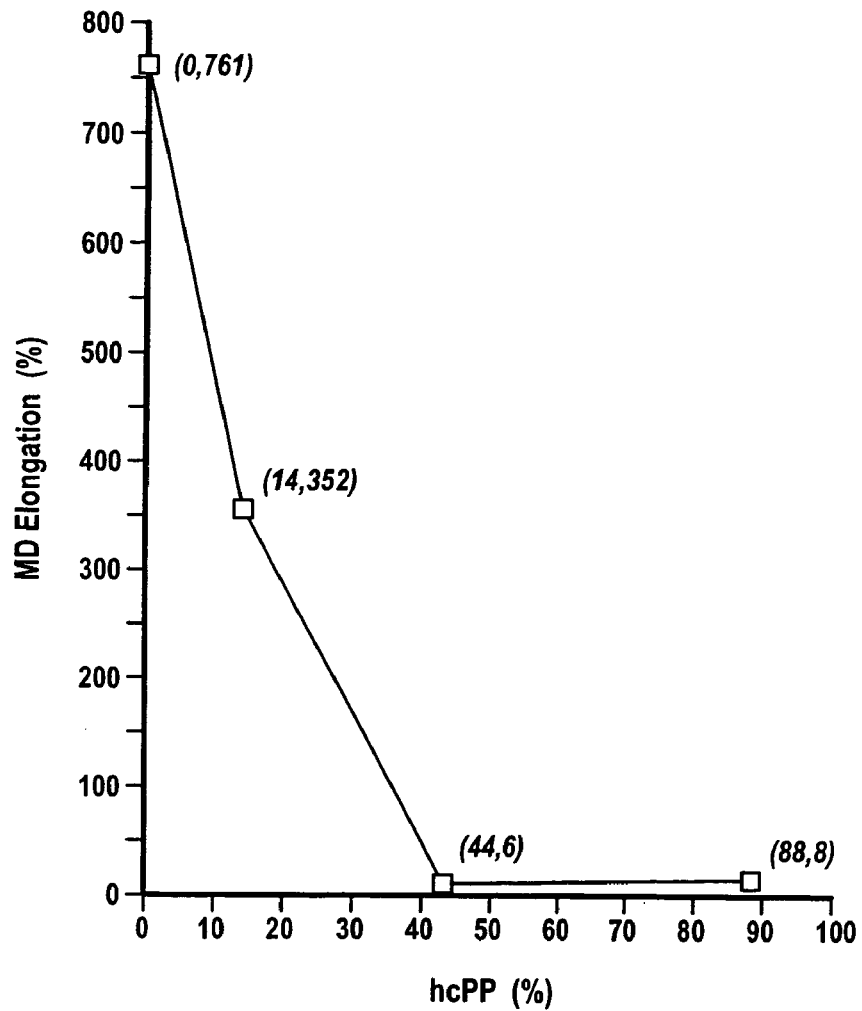
FIG. 1 is a graph of elongation properties in the machine direction of four sample films with different amounts of hcPP.

As shown in FIG. 1, a graph of the elongation values in the machine direction for four sample films, there is a dramatic decrease in the elongation values of the film as the amount of hcPP is increased. The test results and specific compositions of the films tested are discussed in connection with Examples 1–4.

As is understood in the art, the crystallinity of polypropylene can be measured by several methods. For example, the crystallinity of polypropylene can be characterized by the percent by weight of the polypropylene that is soluble in xylene. The hcPP in the film preferably has a xylene soluble content of about 0.5% to about 1% by weight. The hcPP is preferably a propylene homopolymer. Alternatively, the hcPP may be a copolymer of propylene and an α-olefin such as ethylene. However, an hcPP homopolymer is preferred because additions of comonomer such as ethylene may reduce the level of crystallinity in the film. Reducing the level of crystallinity reduces the ease with which the film is torn.

The hcPP preferably has a melt flow rate that is at least about 20 g/10 minutes, and more particularly greater than 20 g/10 minutes. More preferably, the melt flow rate of the hcPP is greater than about 30 g/10 minutes. Most preferably, the melt flow rate of the hcPP is in a range from 30 g/10 minutes to about 50 g/10 minutes. A particularly preferred embodiment includes hcPP with a melt flow rate of 40 g/10 minutes. Prior biaxially oriented films use crystalline polypropylene with melt flow rates of less than about 12 g/10 min, such as those disclosed in U.S. Pat. No. 6,060,139, which is hereby incorporated by reference. Processing with a high melt flow hcPP can be difficult because when melted, hcPP is less viscous than other, lower melt flow polypropylenes. However, while it may be difficult to process, this high melt flow hcPP provides the inventive film with the desired stiffness and tearability without requiring orienting. Suitable hcPP resins include nucleated homopolymer hcPP, such as the resins sold under the tradenames Huntsman P946K-033 available from Huntsman Corporation and Fina EOD-9601 and Fina NO1146, both of which are available from Atofina Chemicals, Inc.

The inventive film further includes standard polypropylene to enable the film to retain sufficient flexibility and durability for ease in processing and for the desired end use. The standard polypropylene preferably has a xylene soluble content of about 2% to about 4% by weight. The polypropylene preferably has a melt flow of about 2 g/10 minutes to about 20 g/10 minutes, more preferably about 8 g/10 minutes to about 18 g/10 minutes. Suitable polypropylene resins includes homopolymer polypropylene such as the resins sold under the tradenames Huntsman 11S12A with a 12 g/10 minutes melt flow, available from Huntsman Corporation;

Amoco 10-6721 with a 7 g/10 minutes melt flow, available from BP p.l.c.; ExxonMobil PP4683E1 with a 9 g/10 minutes melt flow available from ExxonMobil Corporation; and Union Carbide DX5E66 with a 8.8/10 minutes melt flow, available from Dow Chemical Company. The inventive film preferably contains conventional polypropylene in an amount ranging up to about 85% by weight of the film, more preferably ranging from about 15% to about 70% percent, depending on the amount of hcPP and film additives required in the film to obtain the desired physical properties.

The polypropylene is preferably a propylene homopolymer. Homopolymer polypropylene lacks ethylene or other monomers that could alter the crystallinity of the inventive film. Alternatively, the polypropylene may be copolymerized with a minor amount of ethylene or a $C_3$–$C_{10}$ α-olefin. For example, the inventive film may include random copolymer polypropylene ("RCP"). As understood in the art, RCP is propylene copolymerized with ethylene, the amount of ethylene preferably being in a range from about 2% to about 4% by weight of the polypropylene. The method for measuring polypropylene melt flow rate is disclosed in The Wiley Encyclopedia of Packaging Technology (Aaron L. Brody et al. eds., $2^{nd}$ Ed. 1997) p. 677 and methods for manufacturing polypropylene are disclosed in Kirk-Othmer Concise Encyclopedia of Chemical Technology pp. 1420–21 (Jacqueline I. Kroschwitz et al. eds., $4^{th}$ Ed. 1999), which is incorporated herein by reference.

The film may include additives, such as nucleating agents, antiblock compound, antistatic, lubricants, and stabilizers, to assist with processing and/or to improve the physical properties of the film. The inventive film preferably includes at least one nucleating agent to increase crystallinity and dead-fold or memory. The inventive film may include a mix of two or more nucleating agents to provide the desired properties in the film. In addition, the fine-grain particles of the nucleating agent generally improve optical properties of the film.

The amount of nucleating agent incorporated into the film varies depending upon the desired modulus and memory properties. While the inventive film may include any appropriate amount of nucleating agent, the preferred amount is up to about 5% by weight of the film. More preferably the inventive film includes a nucleating agent in a concentration of about 0.1% to about 4% by weight of the film.

Examples of suitable nucleating agents include talc, various silicas, carbon black, kaolin, salts of aliphatic monobasic or dibasic acids or arylalkyl acids, alkali metal or aluminum salts of aromatic or alicyclic carboxylic acids, bis-benzylidene sorbitol, benzoate salts, sodium salts of organic phosphates, and the free acids of the above mentioned salts. The nucleating agents are typically incorporated as a powder or powder mixture, as a suspension or solution, or in the form of a master batch. Regardless of which method is used, predispersion of the nucleating agent is preferred. Suitable nucleating agents include nucleating agents sold under the tradenames Plastolyn 2349 available from Eastman Chemical Corporation and Milliken 8C41-10 available from Milliken & Company. The nucleating agent sold as Plastolyn 2539 is a plastics additive of hydrogenated hydrocarbon resin and polyolefins. The nucleating agent sold as Milliken 8C41-10 is 10% concentrate of a sorbitol based clarifying agent in random copolymer polypropylene with a melt flow of 10 g/10 minutes. Other suitable nucleating agents include nucleating agents sold under the tradenames Ciba Irgaclear D, Ciba Sodium Benzoate and Ciba Irgaclear DM, available from Ciba Specialty Chemicals Corporations, and ABM-107 and ABM101 available from Riverdale Color. Certain nucleating agents, such as those sold under tradenames Milliken 8C41-10, Ciba Irgaclear D and Ciba Irgaclear DM, can also improve film clarity.

The inventive film may further include up to about 30% by weight of a $CaCO_3$ additive. $CaCO_3$ additive can be used to make the film opaque. A preferred $CaCO_3$ additive is 60% calcium carbonate blended with polypropylene, sold under the tradename Standridge 01SAM06162. In embodiments of the film with a core layer and two skin layers, the $CaCO_3$ additive may be included in the core layer or the skin layers. Alternatively, $CaCO_3$ additive may be included in both the core layer and at least one of the skin layers.

While all polypropylene films develop a degree of crystallinity as they age, it has been discovered that incorporating $CaCO_3$ additive speeds the crystallization process. The inventive film without $CaCO_3$ additive is typically allowed to age a few days to a week before the film is sent to a purchaser. However, the inventive film with $CaCO_3$ additive exhibits crystallinity even during or immediately after the manufacturing process. Therefore, films including $CaCO_3$ additive can be sent to the purchaser almost immediately after the film is produced.

When layers of a film are wound onto a roll, the layers can become welded together. Antiblock helps keep films layers separate when the film is wound onto a roll. However, high concentrations of antiblock can create haze in the film. The film preferably further includes antiblock in an amount ranging from about 0.1% to about 5%. Examples of suitable antiblocks include inorganic additives such as silicon dioxide, calcium carbonate, magnesium silicate, aluminum silicate, calcium phosphate and organic additives such as polyamides, polyesters, and polycarbonate. Suitable antiblocks include antiblocks sold under the tradename Ampacet 10126, which is low density polyethylene loaded with 20% antiblock.

The film may further include an external lubricant. External lubricants reduce the coefficient of friction, reducing or eliminating the adhesion of the film to the hot metal components of the film manufacturing equipment. Internal lubricants provide lubrication between the individual polymer chains to allow internal slippage during processing that promotes heat stabilization, reducing melt fracturing of the film. Examples of external lubricants include polyethylene wax, erucamide, and ethylene bis-oleamide (EBO). Stearic acid is an example of an internal lubricant. Calcium/zinc heat stabilizer soaps are process aids that may act as internal and external lubricants. Suitable lubricants include slip compounds sold under the tradenames Ampacet 10090, available from Ampacet Corporation, Techmer PM11458E4, available from Techmer PM, LLC, and Polyfil SSCO500, available from Polyfil Corporation.

Colorants may also be introduced into the packaging film. Colorants may be included, preferably in an amount of up to about 30%. Exemplary colorants include titanium dioxide and calcium carbonate. In the case of a multilayer film, the colorant is preferably included in the core layer to avoid die build up. Including a percentage of hcPP in the core layer decreases the percentage of hcPP in the core layer. In order to preserve the desired stiffness and tearability of the film, the amount of hcPP displaced from the core layer by the inclusion of colorant may be included in the skin layers.

The inventive film may be a single layer film or multilayer film, extruded by conventional extrusion or coextrusion processes well known in the art. The polymer resins for each layer are melted and mixed with any additives in an extruder. The resins are then extruded (or coextruded in the case of multilayer films) through a slot die.

Figure 2:
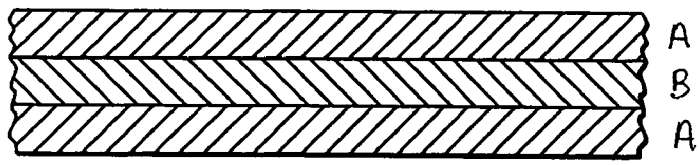
FIG. 2 is a cross-sectional view of an embodiment of the film with three layers.

An embodiment of the inventive film with three layers, a core layer sandwiched between two skin layers is illustrated in FIG. 2. The film illustrated in FIG. 2 is represented by the construction A/B/A and where the two skin layers are identical. Specific film compositions and layer thicknesses are discussed in connection with the examples below.

Figure 3:
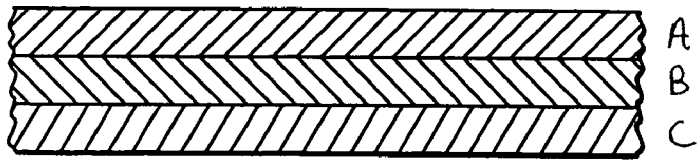
FIG. 3 is a cross-sectional view of another three layer embodiment.

Alternatively, as shown in FIG. 3, the inventive film is represented by A/B/C, with the C layer being different from the A layer. In one embodiment, the A layer is formed from homopolymer polypropylene with a small amount of hcPP and the C layer is a heat seal layer. The heat seal layer preferably contains a polymer with a low melting point, preferably about 50° C. or lower, in amount ranging up to about 20% by weight of the heat seal layer, more preferably about 5% to about 10% by weight of the heat seal layer. Suitable polymers include ethylene vinyl acetate, ethylmethylacrylate and metallocene. The heat seal layer preferably further contains homopolymer polypropylene in an amount ranging from about 80% to about 95% by weight of the heat seal layer.

In multilayer embodiments each skin layer is preferably no more than about 30% of the total thickness of the film. More preferably each skin layer is no greater than about 20% of the film thickness. The core layer is preferably at least about 40% of the film thickness, more preferably at least about 60% of the film thickness. Other embodiments of the film may contain more than three layers. One embodiment of the film has five layers, represented by the construction A/D/B/D/A.

In multilayer embodiments the core layer preferably contains greater amounts of hcPP than the skin layers. In some embodiments, one or both of the skin layers may include no highly crystalline polypropylene. An embodiment with at least one hcPP-free skin layer will make the film more durable because it protects the crystalline, easy to tear core layer. Similarly, skin layers with less hcPP than the core provide some protection and added durability.

Alternatively, the skin layers and core layer may have identical amounts of hcPP. As discussed above, coextrusion of layers with similar or the same viscosities may be simultaneously coextruded on standard coextrusion equipment without the addition of processing agents to increase or decrease viscosity of the resins. Therefore, embodiments with similar or identical amounts of hcPP may have good processing efficiency.

The film of the present invention has a thickness of up to about 4 mil. In films of gauges above about 1 mil, the effect of hcPP on tearability and stiffness is most pronounced. In films having a thickness of about 0.4 mil to about 1 mil, higher levels of hcPP and nucleating agent may be required to achieve the desired stiffness and tearability.

The packaging film of the present invention is in compliance with FDA regulations for food contact applications. Further, the packaging film processes on conventional extrusion equipment at melt temperatures of 215–255° C.

As stated above, the inventive film has physical properties, including good tearability, stiffness and memory, that are desirable for applications such as food wrappers and tampon overwrap. In addition, the inventive film is cost effective because the film achieves these desired physical properties without the step of stretching or orienting the film, as required for conventional polypropylene films used in food wrappers and tampon overwrap.

EXAMPLES

The examples tested have compositions identified in Tables A–F below. In the compositions of the examples identified below, hcPP is nucleated highly crystalline homopolymer polypropylene with a melt flow of 40 g/10 minutes, sold under the tradename Fina EOD-9601. In the examples below, polypropylene refers to standard homopolymer polypropylene with a melt flow of 8.8 g/10 min, sold under the tradename Union Carbide DX5E766. The antiblock identified in the tables below is a mixture of 20% antiblock in low density polyethylene, sold under the tradename Ampacet 10126. The nucleating agent identified below is a plastics additive of hydrogenated hydrocarbon resin and polyolefins, sold under the tradename Plastolyn 2539 ("Plastolyn"). The erucamide slip is 5% erucamide slip in low density polyethylene, sold under the tradename Ampacet 10090. Additional resins used in the following examples are specified below. As used below, "Milliken" refers to a sorbitol nucleating agent in random copolymer polypropylene sold under the tradename Milliken 8C41-10.

Examples 1–4

Examples 1–4 were three layer films, with an A/B/A construction with corresponding thicknesses as identified below in Table A.

TABLE A

| | A/B/A Thicknesses | A Layer | B Layer | Total % hcPP |
|---|---|---|---|---|
| Example 1 | 10%/80%/10% | 94% polypropylene<br>2% antiblock<br>2% nucleating agent<br>2% erucamide slip | 98% polypropylene<br>2% nucleating agent | 0% |
| Example 2 | 25/50/25 | 14% hcPP<br>2% antiblock<br>2% nucleating agent<br>2% erucamide slip | 14% hcPP<br>84% polypropylene<br>2% nucleating agent | 14% |
| Example 3 | 17.5/65/17.5 | 94% polypropylene<br>2% antiblock<br>2% nucleating agent<br>2% erucamide slip | 68% hcPP<br>30% polypropylene<br>2% nucleating agent | 44.2% |
| Example 4 | 25/50/25 | 78% hcPP<br>16% polypropylene<br>2% antiblock<br>2% nucleating agent<br>2% erucamide slip | 98% hcPP<br>2% nucleating agent | 88% |

Four sample films, Examples 1–4, were prepared with the compositions identified above and tested for several physical properties, listed in Table B.

However, as the percentage of hcPP climbs above about 40%, elongation percentages level off between about 6% to about 11%.

TABLE B

| PROPERTY | ASTM TEST # | UNITS | Example 1 | Example 2 | Example 3 | Example 4 |
|---|---|---|---|---|---|---|
| % hcPP | | | 0 | 14 | 44.2 | 88 |
| Gauge | D 2103 | Mils | 1.42 | 1.43 | 1.22 | 1.43 |
| M.D. Elongation | D 882 | % | 761 | 352 | | 6 |
| M.D. Elong. @ Yield | D 882 | % | 10 | 7 | 8 | 6 |
| M.D. Trouser Tear | D 1938 | Grams | 71 | 65 | 61 | 53 |
| M.D. Strip/Gauge | D 2103 | Mils | 1.4 | 1.43 | 1.22 | 1.42 |
| M.D. Secant Modulus | D 882 | Psi | 219,100 | 229,500 | 239,300 | 294,100 |
| T.D. Elongation | D 882 | % | 473 | 7 | 8 | 5 |
| T.D. Elong. @ Yield | D 882 | % | 7 | 7 | 7 | 5 |
| T.D. Trouser Tear | D 1938 | Grams | 190 | 170 | 144 | 134 |
| T.D. Strip/Gauge | D 2103 | Mils | 1.42 | 1.4 | 1.24 | 1.43 |
| T.D. Secant Modulus | D 882 | Psi | 190,600 | 215,700 | 223,000 | 262,200 |
| Haze | D 1003 | % | 10.4 | 11 | 12.1 | 8.79 |
| Gloss (in) | D 2457 | % | 52.9 | 49.3 | 45.3 | 54 |
| Gloss (out) | D 2457 | % | 53.3 | 49 | 45.5 | 53.4 |

As shown in Table B, the example films with greater than 14% hcPP, Examples 3 and 4, have elongation values that are very low in both the machine direction and the tensile direction, making the film easy to tear. Also, Examples 3 and 4 have lower trouser tear values than Examples 1 and 2, indicating that higher amounts of hcPP also lower resistance to tear propagation. Examples 3 and 4 also have secant modulus values above 220,000 in both the machine direction and the transverse direction. In contrast, Examples 1 and 2 have elongation values above 350% and secant modulus values less than Examples 3 and 4. Thus it can be seen that including amounts of hcPP greater than about 15% by weight of the film provides low elongation percentages, making the film easy to tear. As shown by the data in Table B, amounts of hcPP greater than 15% combined with a nucleating agent provide good stiffness and tearability.

Examples 5–6

A sample film of the composition listed above in Table 1 for Example 3 was prepared and compared with Examples 5 and 6. The composition of Examples 5 and 6 was identical to Example 3, except for the hcPP and nucleating agent used. The hcPP included in Examples 5 and 6 was a hcPP with a melt flow of 20 g/10 minutes. The nucleating agent was Milliken nucleating agent. Examples 3 and 5–6 were three layer films, represented by the construction A/B/A with corresponding thicknesses of 17.5/65/17.5. The physical properties of Examples 3 and 5–6 were tested and are shown in Table C.

TABLE C

| PROPERTY | ASTM TEST # | UNITS | Example 3 | Example 5 | Example 6 |
|---|---|---|---|---|---|
| Resin Melt Flow | | | 40 | 20 | 20 |
| Gauge | D 2103 | Mils | 1.34 | 1.40 | 1.51 |
| M.D. Elongation | D 882 | % | 9 | 353 | 225 |
| M.D. Elong. @ Yield | D 882 | % | 7 | 7 | 7 |
| M.D. Trouser Tear | D 1938 | Grams | 53 | 67 | 99 |
| M.D. Strip/Gauge | D 2103 | Mils | 1.38 | 1.41 | 1.46 |
| M.D. Secant Modulus | D 882 | Psi | 245,800 | 215,321 | 203,876 |
| T.D. Elongation | D 882 | % | 8 | 5 | 6 |
| T.D. Elong. @ Yield | D 882 | % | 7 | 5 | 6 |
| T.D. Trouser Tear | D 1938 | Grams | 154 | 165 | 166 |
| T.D. Strip/Gauge | D 2103 | Mils | 1.36 | 1.40 | 1.47 |
| T.D. Secant Modulus | D 882 | Psi | 228,800 | 203,114 | 193,357 |
| Haze | D 1003 | % | 11.2 | 4.7 | 5.12 |
| Gloss (in) | D 2457 | % | 52.5 | 76.5 | 74.2 |
| Gloss (out) | D 2457 | % | 52.6 | 74.9 | 74.0 |

As shown in the test results listed in Table C, a film containing 20 melt flow hcPP has lower stiffness values and higher elongation values and trouser tear values than a film with the same amount of a 40 melt flow hcPP. For example, Example 5 has an elongation in the machine direction of 352% and Example 6 has an elongation in the machine direction of 225, while Example 3 has an elongation in the machine direction of 9%. Increasing the amount of 20 melt flow hcPP and the amount of nucleating agent would be expected to improve the stiffness and tearability of film containing hcPP with a melt flow around 20 g/10 minutes.

Examples 7–10

Examples 7–10 were prepared with different amounts and types of nucleating agents and tested for the physical properties listed below in Table E. The compositions for Examples 7–10 were the same as the composition for Example 3, identified above in Table 1, except that the type and amount of nucleating agent is identified below Table D.

TABLE D

|  | Nucleating Agent | Percentage |
|---|---|---|
| Example 7 |  | 0% |
| Example 8 | Milliken | 4% |
| Example 9 | Plastolyn | 2% |
| Example 10 | Plastolyn | 4% |

Examples 8–10. The nucleating agent also lowers the trouser tear value, a measure of how easily a tear propagates once the film has been punctured. In addition, as shown by the data in Table E, the Milliken nucleating agent provides the film with lower percentage haze value, thus increasing film clarity in clear or natural films which are those without pigment of colorant.

Crystallinity Examples

Several sample films were prepared with varying levels of hcPP and nucleating agents. One sample of prior art biaxially oriented polypropylene ("BOPP") film was also tested. The sample films were then evaluated at the three different temperature points: onset of melting, peak melting temperature, and peak recrystallization temperature. The results were obtained using a differential scanning calorimeter that determined the melting and recrystallization curves of each film. The melting curve include an "onset" temperature at which the film begins to melt and a "peak" temperature at which the film is completely melted. Films with high melting points are preferred because an increased melting point indicates a high degree of crystallinity, modulus, ease of tearing and barrier properties of the packaging film. The

TABLE E

| PROPERTY | ASTM TEST # | UNITS | Example 7 | Example 8 | Example 9 | Example 10 |
|---|---|---|---|---|---|---|
| Gauge | D 2103 | Mils | 1.44 | 1.35 | 1.34 | 1.41 |
| Haze | D 1003 | % | 9.9 | 4.3 | 11.2 | 8.5 |
| Gloss (in) | D 2457 | % | 59.0 | 80.5 | 52.5 | 64.5 |
| Gloss (out) | D 2457 | % | 60.4 | 80.9 | 52.6 | 63.7 |
| M.D. Elongation | D 882 | % | 10 | 7 | 9 | 8 |
| M.D. Elong. @ Yield | D 882 | % | 8 | 7 | 7 | 7 |
| M.D. Trouser Tear | D 1938 | Grams | 92 | 70 | 53 | 51 |
| M.D. Strip/Gauge | D 2103 | Mils | 1.43 | 1.37 | 1.38 | 1.41 |
| M.D. Secant Modulus | D 882 | Psi | 226,000 | 230,900 | 245,800 | 241,400 |
| T.D. Elongation | D 882 | % | 9 | 7 | 8 | 7 |
| T.D. Elong. @ Yield | D 882 | % | 8 | 6 | 7 | 6 |
| T.D. Trouser Tear | D 1938 | Grams | 143 | 146 | 154 | 148 |
| T.D. Strip/Gauge | D 2103 | Mils | 1.42 | 1.36 | 1.36 | 1.39 |
| T.D. Secant Modulus | D 882 | Psi | 204,600 | 239,800 | 228,800 | 218,300 |

Table E shows nucleating agent increases the film stiffness, as indicated by the higher secant modulus values for Examples 8–10.

recrystallization peak identifies the temperature at which the film recrystallizes into its original form.

TABLE F

| Film Type | % hch PP | % Nucl. Agent | Nucl. Agent | Gauge (mil) | Onset Temp (° C.) | Peak Temp (° C.) | Recrystallization Peak |
|---|---|---|---|---|---|---|---|
| HcPP | 44 | 0 | — | 1.41 | 157.828 | 166.147 | 130.633 |
| HcPP | 44 | 2 | Milliken | 1.38 | 159.446 | 164.850 | 129.966 |
| HcPP | 44 | 4 | Milliken | 1.45 | 158.661 | 165.100 | 132.133 |
| HcPP | 44 | 2 | Plastolyn | 1.22 | 157.001 | 163.516 | 130.466 |
| HcPP | 44 | 4 | Plastolyn | 1.46 | 156.345 | 165.913 | 129.800 |
| HcPP | 44 | 2 | Plastolyn | 2 | 156.222 | 166.016 | 129.633 |
| HcPP | 44 | 2 | Plastolyn | 1 | 157.724 | 163.266 | 130.133 |
| HcPP | 88 | 2 | Plastolyn | 1.43 | 161.382 | 166.350 | 130.300 |
| HcPP | 14 | 2 | Plastolyn | 1.43 | 160.248 | 164.183 | 126.966 |
| HcPP | 0 | 2 | Plastolyn | 1.41 | 156.062 | 160.183 | 113.466 |
| BOPP | 0 | — | — | — | 151.233 | 156.183 | 110.633 |

Table F shows that films containing hcPP have a higher melting point than standard BOPP films, as evidenced by the fact that hcPP films began melting in the temperature range of about 156 to about 160° C. and were completely melted by about 160 to about 166° C. whereas a standard BOPP film began melting at 151° C. and was completely melted by 156° C. Thus the films containing hcPP have higher crystallinity and, as a result, exhibit superior tear properties. thus increased tearability. This conclusion corresponds with the conclusions drawn from the data presented in FIGS. 1–4.

Table F also shows that the presence of nucleating agents generally increases the crystallinity of the packaging film. However, the type of nucleating agent had little effect on the crystallinity. Further, the gauge had little effect on the crystallinity.

Finally, Table F shows that the melting point increased with increasing amounts of hcPP. Thus, the greater the weight percent of hcPP contained within the film, the higher the degree of crystallinity, resulting in improved tearability, stiffness, clarity, and barrier properties.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A nonoriented film comprising:
a core layer containing highly-crystalline polypropylene, polypropylene, and a nucleating agent, wherein said highly-crystalline polypropylene has a melt flow of at least about 20 g/10 minutes; and
two skin layers containing polypropylene having a melt flow of up to about 20 g/10 minutes, and highly-crystalline polypropylene having a melt flow of at least about 20 g/10 minutes.

2. The film of claim 1, wherein said highly-crystalline polypropylene comprises at least about 15% by weight of said film.

3. The film of claim 1, wherein said nucleating agent comprises from about 0.1% to about 5% by weight of said film.

4. The film of claim 1, wherein at least one of said skin layers further comprises highly-crystalline polypropylene having a melt flow of at least 30 g/10 minutes.

5. The film of claim 1, wherein said core layer further comprises a colorant.

6. The film of claim 1, wherein said highly-crystalline polypropylene comprises from about 30% to about 90% by weight of said film.

7. The film of claim 6, wherein said highly-crystalline polypropylene comprises from about 40% to about 50% by weight of said film.

8. The film of claim 1, wherein said highly-crystalline polypropylene has a melt flow of from about 30 g/10 minutes to about 50 g/10 minutes.

9. The film of claim 8, wherein said highly-crystalline polypropylene has a melt flow of about 40 g/10 minutes.

10. The film of claim 1, wherein said nucleating agent comprises less than 5% by weight of said film.

11. The film of claim 1, wherein said polypropylene is a homopolymer polypropylene having a melt flow of from about 8 g/10 minutes to about 20 g/10 minutes.

12. The film of claim 1, wherein said film breaks at an elongation of less than about 350% as measured by ASTM D 882.

13. The film of claim 1, wherein said film breaks at an elongation of less than about 100% as measured by ASTM D 882.

14. The film of claim 1, wherein said film breaks at an elongation of less than about 200% as measured by ASTM D 882.

15. The film of claim 1, wherein said film breaks at an elongation of less than 15% as measured by ASTM D 882.

16. The film of claim 1, wherein said film further comprises a trouser tear of less than about 100 grams.

17. The film of claim 1, wherein said film has a secant modulus value of greater than or equal to about 200,000 psi.

18. The film of claim 1, wherein said highly-crystalline polypropylene comprises from about 35% to about 65% by weight of said film.

19. The film of claim 1, wherein said highly-crystalline polypropylene has a xylene-soluble content of from about 0.5% to about 1% by weight.

20. The film of claim 1, wherein said polypropylene has a xylene-soluble content of from about 2% to about 4% by weight.

21. The film of claim 1, wherein said polypropylene has a melt flow of from about 2 g/10 minutes to about 20 g/10 minutes.

22. The film of claim 21, wherein said polypropylene has a melt flow of from about 8 g/10 minutes to about 18 g/10 minutes.

23. The film of claim 1, wherein said polypropylene comprises up to about 85% by weight of said film.

24. The film of claim 23, wherein said polypropylene comprises from about 15% to about 70% by weight of said film.

25. The film of claim 1 wherein said polypropylene is a polypropylene copolymer.

26. The film of claim 25 wherein said polypropylene copolymer is a random copolymer polypropylene.

27. The film of claim 1 further comprising at least one additive selected from the group consisting of antiblock compounds, antistatics, lubricants, stabilizers and mixtures thereof.

28. The film of claim 10, said nucleating agent comprising from about 0.1% to about 4% by weight of said film.

29. The film of claim 1, wherein said nucleating agent is selected from the group consisting of talc, silica, carbon black, kaolin, salts of aliphatic monobasic acids and free acids thereof, salts of aliphatic dibasic acids and free acids thereof, salts of arylalkyl acids and free acids thereof, alkali metals of aromatic carboxylic acids, alkali metals of alicyclic carboxylic acids, aluminum salts of aromatic carboxylic acids and free acids thereof, aluminum salts of alicyclic carboxylic acids and free acids thereof, bis-benzylidene sorbitol, benzoate salts and free acids thereof, sodium salts of organic phosphates and free acids thereof, and mixtures thereof.

30. The film of claim 1 wherein said nucleating agent is in a form selected from the group consisting of powders, powder mixtures, suspensions, solutions, master batches, or mixtures thereof.

31. The film of claim 30 wherein said nucleating agent is predispersed.

32. The film of claim 1 further comprising up to about 30% by weight of a $CaCO_3$ additive.

33. The film of claim 32 wherein said $CaCO_3$ additive is a 60% calcium carbonate/propylene blend.

34. The film of claim 27, wherein said antiblock compounds are selected from the group consisting of silicon dioxide, calcium carbonate, magnesium silicate, aluminum silicate, calcium phosphate, polyamides, polyesters, polycarbonates, and mixtures thereof.

35. The film of claim 34, wherein said film comprises from about 0.1% to about 5% by weight of said antiblock compound.

36. The film of claim 27, wherein said lubricants are selected from the group consisting of polyethylene wax, erucamide, ethylene bis-oleamide, stearic acid, calcium/zinc heat-stabilizer soaps, slip compounds, and mixtures thereof.

37. The film of claim 5, wherein said colorants is selected from the group consisting of titanium dioxide, calcium carbonate, and mixtures thereof.

38. The film of claim 37, wherein said film comprises up to about 30% by weight of said colorants.

39. The film of claim 1 wherein said highly-crystalline polypropylene is a homopolymer.

40. The film of claim 1 wherein said highly-crystalline polypropylene is a copolymer.

41. The film of claim 40 wherein said copolymer comprises propylene and an α-olefin.

42. The film of claim 41 wherein said α-olefin is ethylene.

43. The film of claim 1 wherein said film has a thickness of from about 0.4 mils to about 2.0 mils.

44. The film of claim 1 wherein said film has a thickness of from about 1.0 mils to about 2.0 mils.

* * * * *